United States Patent

Kiel et al.

[11] Patent Number: 5,624,163
[45] Date of Patent: Apr. 29, 1997

[54] PRESSURE MEDIUM ACTUATED VEHICLE BRAKING SYSTEM

[75] Inventors: Bernd Kiel, Wunstorf; Karl-Heinz Unser, Muggensturm, both of Germany

[73] Assignees: WABCO GmbH, Hanover; Mercedes-Benz AG, Stuttgart, both of Germany

[21] Appl. No.: 596,832

[22] Filed: Feb. 5, 1996

[30] Foreign Application Priority Data

Feb. 10, 1995 [DE] Germany .................. 195 04 394.4

[51] Int. Cl.$^6$ .............. B60T 17/18; B60T 13/36; B60T 15/18
[52] U.S. Cl. .............. 303/6.01; 303/7; 303/13; 303/15; 303/52; 303/28
[58] Field of Search .............. 303/13, 14, 15, 303/9.62, 9.66, 9.63, 6.01, 7, 8, 9, 28, 40, 50–56; 188/349, 3 R, 3 H; 137/627.5

[56] References Cited

U.S. PATENT DOCUMENTS

| 4,616,881 | 10/1986 | Müller et al. ............ 303/7 |
| 4,673,222 | 6/1987 | Knight ............ 303/13 |
| 4,919,492 | 4/1990 | Samuelson et al. ............ 303/15 |

FOREIGN PATENT DOCUMENTS

| 0079543A1 | 5/1983 | Germany . |
| 3204185A1 | 8/1983 | Germany . |
| 3526048A1 | 7/1985 | Germany . |
| 4140271A1 | 12/1991 | Germany . |

*Primary Examiner*—Douglas C. Butler
*Attorney, Agent, or Firm*—Meltzer, Lippe, Goldstein, et al.

[57] ABSTRACT

A pressure medium actuated braking system comprises a first (rear axle) braking circuit, a second (front axle) braking circuit, and a multi-circuit braking power imparting device, such as a motorcar brake valve. The motorcar brake valve produces first and second control signals for the first and second braking circuits. The first braking circuit has a first pressure medium storage container assigned to it, at least one braking cylinder, and a first control valve system which connects the braking cylinder to the first pressure medium storage container or to a pressure medium sink (atmosphere) depending on the first control signal. The second braking circuit has a second pressure medium storage container, first and second braking cylinders, and a second control valve system. The second control valve system comprises first and second control valves assigned to the first and second brake cylinders respectively of the second braking circuit. The first control valve connects the first braking cylinder to the second pressure medium storage container, to a third pressure medium storage container, or to a pressure medium sink, depending on the first and second control signals. The second control valve connects the second braking cylinder of the second braking circuit to the second pressure medium storage container or to a pressure medium sink depending on the second control signal produced by the motorcar brake valve for the second braking circuit.

23 Claims, 2 Drawing Sheets

PRESSURE MEDIUM ACTUATED VEHICLE BRAKING SYSTEM

BACKGROUND OF THE INVENTION

The invention relates to a pressure-medium actuated vehicle braking system have separate braking circuits for the front and rear axles.

A braking system of this type is known from EP-A 0 079 543.

This known braking system comprises a dual circuit braking system wherein a relay valve system is assigned to the brake cylinders of the front axle as well as to the brake cylinders of the rear axle for the control of the braking pressure.

The division of the braking system into two braking circuits ensures, in case of the failure of one braking circuit, that the braking cylinders of the other braking circuit are still supplied with pressure medium, so that the vehicle can be decelerated with relative safety.

In case of failure of the braking circuit serving as the rear axle braking circuit, good deceleration of the vehicle is still achieved, since due to the dynamic axle load displacement during a braking event, approximately 70 to 80% of the braking force is produced by the wheels of the front axle of the vehicle.

However, if the braking circuit assigned to the wheels of the front axle of the vehicle fails, it may be difficult to reach the braking force that must be produced by the wheels of the rear axle of the vehicle as prescribed by law. This may occur particularly when the vehicle has a very low empty weight and a high admissible overall weight, since the wheels of the rear axle of the unloaded vehicle are not subjected, under unfavorable circumstances, to a force in the direction of the road surface which would ensure good deceleration of the vehicle.

It is therefore the object of the invention to provide a vehicle braking system actuated by a pressure medium of the type mentioned initially, and which is designed so that reliable deceleration of the vehicle is ensured even under unfavorable road and weight conditions for the vehicle and even in case of a failure in one braking circuit of the vehicle.

SUMMARY OF THE INVENTION

In accordance with the present invention, a pressure medium actuated braking system comprises at least first and second braking circuits associated with first and second axles, and a multi-circuit braking power imparting device, such as a motorcar brake valve. The first braking circuit has a first pressure medium storage container assigned to it, at least one braking cylinder, and a first control valve system which connects the braking cylinder to the first pressure medium storage container or to a pressure medium sink depending on a first control signal produced by the motorcar brake valve for the first braking circuit. The second braking circuit has a second pressure medium storage container, first and second braking cylinders, and a second control valve system. The second control valve system comprises first and second control valves assigned to the first and second brake cylinders respectively of the second braking circuit. The first control valve connects the first braking cylinder of the second braking circuit to one of two pressure medium sources which are independent of each other, or to a pressure medium sink depending on the control signals produced by the brake valve for the first and second braking circuits. The second control valve connects the second braking cylinder of the second braking circuit to the second pressure medium storage container or to a pressure medium sink depending on a control signal produced by the motorcar brake valve for the second braking circuit. Preferably, the first braking cylinder of the second braking circuit is connected to the second pressure medium storage container or to a third pressure medium storage container which is independent of the second pressure medium storage container.

This invention offers in particular the advantage of a vehicle braking system where in case of a failure occurring in one of the two braking circuits, the supply of braking pressure to one of the two braking cylinders assigned to the failing braking circuit is still ensured. Pressure from the intact braking circuit or pressure from a pressure medium source that is independent of the two braking circuits of the vehicle will provide braking pressure for this one braking cylinder of the defective braking circuit.

To ensure the supply of braking pressure to one of the two brake cylinders in case of a defect in the braking circuit containing the two braking cylinders, the control valve system assigned to this brake cylinder comprises a first control valve assigned to the first brake cylinder of this braking circuit and a second control valve which is assigned to the second brake cylinder of this braking circuit.

The first control valve system is made in the form of an actuated dual circuit control valve through which the first brake cylinder can be connected to a pressure medium input chamber of the first control valve or to a pressure medium sink in dependence on a signal associated with the braking circuit of the first and second brake cylinders, and in dependence on a control signal associated with another braking circuit. The control medium input chamber of the first control valve is connected to the pressure medium source of the braking circuit containing the first and second brake cylinders and also to a different (independent) pressure medium source. Means to shut off the two pressure medium sources from each other are provided between the pressure medium input chamber and the pressure medium sources.

In order to secure the independence of the two pressure medium sources, a check valve which can be brought into open position in the direction of the pressure medium input chamber is installed in each of the two pressure medium inputs of the first control valve. In case of a defect occurring, this check valve prevents pressure medium from escaping from the intact, other braking circuit via the pressure medium input chamber of the first control valve and the defective braking circuit.

BRIEF DESCRIPTION OF THE DRAWINGS

An embodiment of the invention is explained below in further detail by reference to the drawings, wherein.

DETAILED DESCRIPTION OF THE INVENTION

Figure 1:
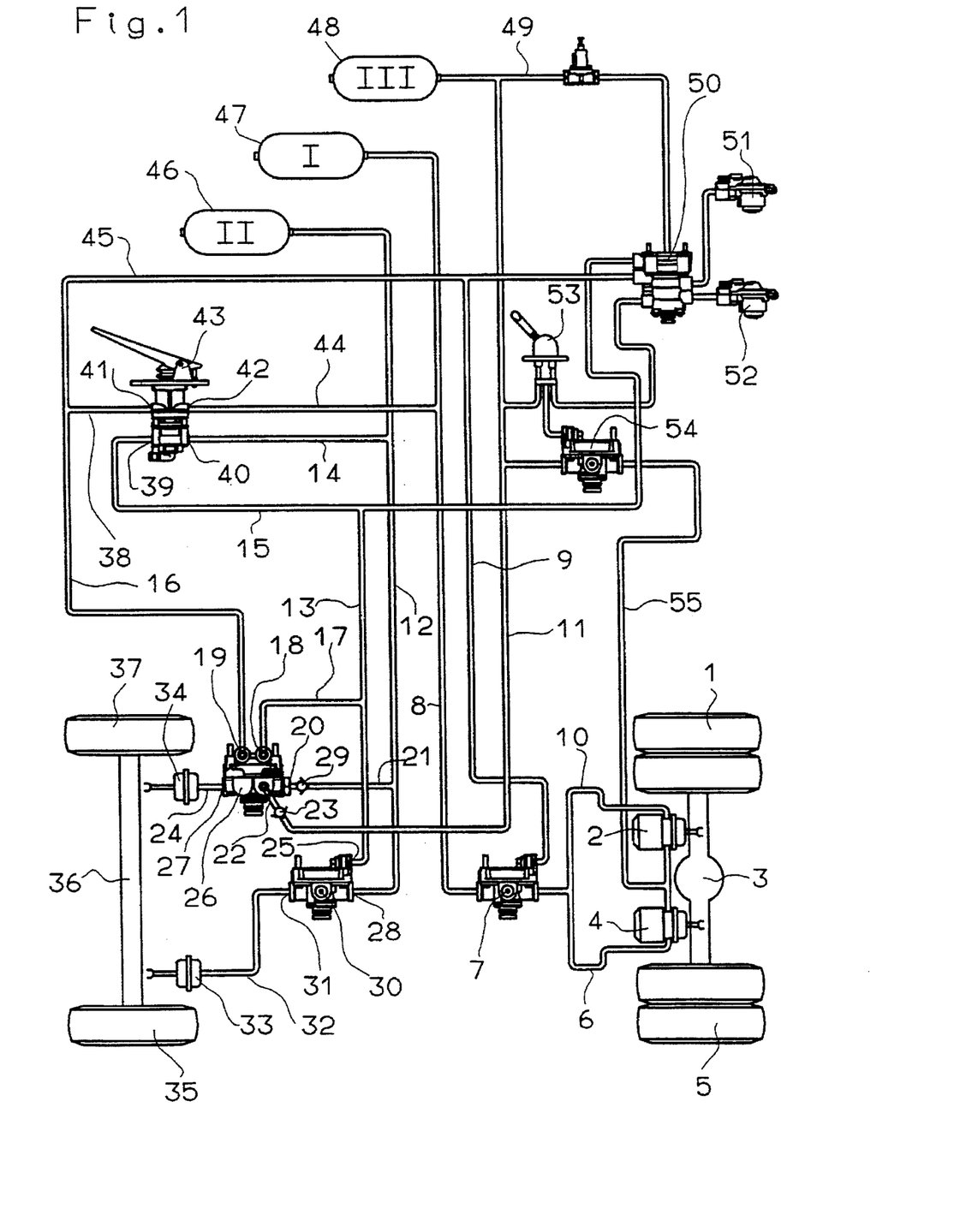
FIG. 1 shows a triple-circuit vehicle braking system with two control valves assigned to the brake cylinders of the front axle of the vehicle.

FIG. 1 schematically shows the braking system of a two-axle traction vehicle, wherein a first axle is the rear axle (3) and a second axle is the front axle (36). The rear axle (3) has a first wheel (1) and a second wheel (5), while the front axle (36) has a first wheel (37) and a second wheel (35). The first wheel (1) of the rear axle (3) is assigned a first brake cylinder (2) in the form of a spring brake cylinder, and the second wheel (5) of the rear axle (3) is assigned a second brake cylinder (4) also in the form of a spring brake cylinder. The first brake cylinder (2) and the second brake cylinder (4) are connected via pressure medium lines (10) and (6) to the pressure medium output of a first control valve system (7) in the form of a relay valve.

The pressure medium input of the first control valve system (7) is connected via a pressure medium line (8) to a first pressure medium storage container (47) serving as a pressure medium source for the first (rear axle) braking circuit (I). A control input of the first control valve system (7) is connected via a pressure medium line (9) and via pressure medium lines (45) and (38) to the second pressure medium output (41) of a multi-circuit braking power imparting device in the form of motorcar brake valve (43). Motorcar brake valve (43) has a first pressure medium input (40), a first pressure medium output (39) serving to provide a control output, a second pressure medium input (42) and the second pressure medium output (41) which provides the control output conveyed to the control input of the first control valve system (7). The second pressure medium input (42) of the motorcar brake valve (43) assigned to the second pressure medium output (41) is connected via pressure medium line (44) and pressure medium line (8) to the first pressure medium storage container (47).

The two brake cylinders (2) and (4) of the rear axle (3) are connected via a pressure medium line (55) and a relay valve (54) to a first output of a hand brake valve (53). The input of the hand brake valve (53) is connected via pressure medium lines (11) and (49) to pressure medium storage container (48), referred to herein as the third pressure medium storage container.

The first wheel (37) of the front axle (36) is assigned a first brake cylinder (34) and the second wheel (35) of the front axle (36) is assigned a second brake cylinder (33).

The first brake cylinder (34) of the front axle (36) is connected via a pressure medium line (24) to the pressure medium output (27) of a first control valve (26) in the form of a relay valve of a second control valve system (26, 30). In addition to the first control valve (26), the second control valve system (26, 30) also includes a second control valve (30). A first pressure medium input (20) of the first control valve (26) is connected via pressure medium line (21) and pressure medium line (12) to a second pressure medium storage container (46) which services the second (front axle) braking circuit (II). A second pressure medium input (22) of the first control valve (26) is connected via pressure medium line (11) and pressure medium line (49) to the third pressure medium storage container (48).

The first control valve (26) is provided with a first control input (18) and a second control input (19). The second control input (19) is connected via pressure medium lines (16) and (38) to the second pressure medium output (41) of the motorcar brake valve (43). The first control input (18) of the first control valve (26) is connected via control medium line (17), its connected pressure medium line (13) and via pressure medium line (15) connected to the pressure medium line (13), to the first pressure medium output (39) of the motorcar brake valve (43).

The second brake cylinder (33) is connected via a pressure medium line (32) to the output (31) of the second control valve (30) of the second control valve system (26, 30). The second control valve (30) is provided with a pressure medium input (28) which is connected via the pressure medium line (12) to the second pressure medium storage container (46). A control input (25) of the second control valve (30) is connected via the pressure medium line (13) and its connected pressure medium line (15) to the first pressure medium output (39) of the motorcar brake valve (43). The first pressure medium input (40) of the motorcar brake valve (43) assigned to the first pressure medium output (39) is also connected via a pressure medium line (14) and its connected pressure medium line (12) to the second pressure medium storage container (46).

Coupling heads (51) and (52) can be connected via a valve device (50) to the third pressure medium supply container (48) in order to connect the braking system of the traction vehicle to the braking system of a trailer vehicle.

A first check valve (29), which can be brought into open position in the direction of the pressure medium input chamber of the second control valve (26) by the pressure of the second pressure medium storage container (46), is installed in the first pressure medium input (20) of the first control valve (26) of the second control valve system (26, 30). In a similar manner, a second check valve (23), which can be brought into open position by the pressure of the third pressure medium storage container (48) in the direction of the pressure medium input chamber of the second control valve (26), is installed in the second pressure medium input (22) of the second control valve (26).

The two check valves (29) and (23) serve as means to separate the two pressure medium sources (46) and (48) from each other.

The brake cylinders (2) and (4) of the rear axle (3) together with the pressure medium lines (10) and (6), the first control valve system (7), the pressure medium lines (8), (9), (44), (38) and (45), the first pressure medium storage container (47), and the second pressure medium input (42) and the second pressure medium output (41) of the motor car brake valve (43) constitute a first (rear axle) braking circuit (I) of the pressure medium actuated vehicle braking system. A second braking circuit (II) serving as the front axle braking circuit of the pressure medium actuated vehicle braking system is constituted by the brake cylinders (34) and (33) of the front axle (36), the pressure medium lines (24) and (32), the second control valve (30) and the first control valve (26) of the second control valve system (30, 26), the pressure medium lines (12), (14), (15), (13), (17) and (21), the second pressure medium supply container (46), and the first pressure medium input (40) and the first pressure medium output (39) of the motorcar brake valve (43).

The third pressure medium storage container (48), the pressure medium line (49), the valve system (50), the coupling heads (51) and (52), as well as the hand brake valve (53) and the relay valve (54) constitute a third braking circuit (III) of the pressure medium actuated vehicle braking system. The third braking circuit (III) serves on the one hand to supply braking pressure to a trailer braking system which is not shown here, and on the other hand to supply the spring loaded brake cylinders (2) and (4) of the rear axle (3) with brake release pressure.

The pressure medium input of the first control valve (26) is supplied with brake supply pressure from the second braking circuit (II) on the one hand via the first pressure medium input (20) and on the other hand with brake supply pressure from the third braking circuit (III) via the second pressure medium input (22). The first control valve (26) of the second control valve system (26, 30) is actuated by pressure medium from the second braking circuit (II)—from the pneumatic control signal assigned to the second braking circuit (II)—via the first control input (18). The first control valve (26) of the second control valve system (26, 30) is also actuated by pressure medium from the first braking circuit (I)—from the pneumatic control signal assigned to the first braking circuit (I)—via the second control input (19).

The operation of the above-described pressure-medium actuated vehicle braking system is described in further detail below.

Pressure medium from the first pressure medium supply container (47) of the first braking circuit (I) is present in the pressure medium input chamber of the first control valve system (7). The control input of the first control valve system (7) as well as the two brake cylinders (2) and (4) of the rear axle (3) are without pressure when the motorcar brake valve (43) is not actuated. Pressure from the second pressure medium supply container (46) of the second braking circuit (II) is present in the pressure medium input chamber of the second control valve (30) of the second control valve system (26, 30). The pressure medium input chamber of the first control valve (26) of the second control valve system (26, 30) is supplied through the first pressure medium input (20) with pressure from the second pressure medium supply container (46) of the second braking circuit (II) and via the second pressure medium input (22) with the pressure from the third pressure medium storage container (48) of the third braking circuit (III). The two control inputs (18) and (19) of the control valves (26) and (30) of the second control valve system (26, 30) and the brake cylinders (34) and (33) of the front axle (36) of the vehicle are without pressure when the motorcar brake valve (43) is not actuated.

When the motorcar brake valve (43) is actuated, pressure medium serving as control pressure flows from the second pressure medium output (41) of the motor car brake valve (43) out of the first pressure medium supply container (47) of the first braking circuit (I) via the pressure medium lines (38), (45) and (9) to the control input of the first control valve system (7) which is in the form of a relay valve. The valve of the first control valve system (7) goes first into open position, and pressure medium from the first pressure medium supply container (47) flows into the brake cylinders (2) and (4) of the rear axle (3) of the vehicle via the pressure medium lines (10) and (6) until the first control valve system (7) has reached the terminal position.

At the same time, pressure medium serving as control pressure medium goes from the first pressure medium supply container (47) of the first braking circuit (I) via the pressure medium lines (38) and (16) from the second pressure medium output (41) of the motorcar brake valve (43) to the second control input (19) of the first control valve (26) of the second control valve system (26, 30). Pressure medium serving as control pressure flows from the first pressure medium output (39) of the motor car brake valve (43) via pressure medium lines (15) and (13) out of the second pressure medium supply container (46) of the second braking circuit (II) to the control input (25) of the second control valve (30) of the second control valve system (26, 30) and through the pressure medium line (17) connected to the pressure medium line (13) to the first control input (18) of the first control valve (26) of the second control valve system (26, 30).

The valve of the second control valve (30) and the valve of the first control valve (26) of the second control valve system (26, 30) first go into open position. Pressure medium is transmitted from the pressure medium supply container (46) of the second braking circuit (II) into the second brake cylinder (33) of the front axle (36) until the second control valve (30) reaches its terminal position. Pressure medium from the pressure medium supply container (46) of the second braking circuit (II) or pressure medium from the third pressure medium storage container (48) of the third braking circuit (III) is transmitted into the first brake cylinder (34) of the front axle (36) until the first control valve (26) has reached its terminal position. Since the pressure medium input chamber of the first control valve (26) is connected via check valves (29) and (23) to the pressure medium supply container (46) of the second braking circuit (II) and to the pressure medium storage container (48) of the third braking circuit (III), the supply pressure which is higher enters the pressure medium input chamber of first control valve (26) and thereby the first brake cylinder (34) of the front axle (36). The brakes of the rear axle (3) and the front axle (36) are thereby actuated and the vehicle is decelerated.

If a defect occurs, e.g., in the pressure medium line (12) going from the pressure medium supply container (46) of the second braking circuit (II) to the first pressure medium input (20) of the first control valve (26) and to the pressure medium input (28) of the second control valve (30) of the second control valve system (26, 30), so that pressure medium escapes from the pressure medium line (12) into the atmosphere, the second brake cylinder (33) of the front axle (36) of the vehicle is left without pressure. Since the pressure medium line (21) which branches off from the pressure medium line (12) and goes to the first pressure medium input (20) of the first control valve (26) is also left without pressure, the first check valve (29) of the first control valve (26) is placed into closed position. The pressure medium input chamber of the first control valve (26) is then shut off by the first check valve (29) against the pressure medium line (12).

The first brake cylinder (34) of the front axle (36) is now supplied exclusively with pressure medium from the pressure medium storage container (48) of the third braking circuit (III). Since only one brake cylinder of the front axle (36) of the vehicle fails, part of the braking force needed to decelerate the vehicle can still be produced by the other brake cylinder of the front axle (36) and the brake cylinders of the rear axle of the vehicle.

If, on the other hand, the pressure medium line (11) of the third braking circuit (III) fails, the pressure medium input chamber of the first control valve (26) of the second control valve system (26, 30) is shut off by means of the second check valve (23) of the first control valve (26) from the pressure medium line (11). The first brake cylinder (34) of the front axle (36) is then supplied exclusively with the pressure medium from the pressure medium supply container (46) of the second braking circuit (II). The ability of the brakes of the first wheel (37) and of the second wheel (35) of the front axle (36) of the vehicle to operate is maintained in this case.

If a defect occurs during a braking process in pressure medium line (15) or (13) going from the motorcar brake valve (43) to the first control input (18) of the first control valve (26) and to the control input (25) of the second control valve (30) of the second control valve system (26, 30), the first control input (18) of the first control valve (26) and the control input (25) of the second control valve (30) are left without pressure. The second control valve (30) goes from its intake position into its outlet position. The second brake cylinder (33) of the front axle (36) of the vehicle is depressurized. Thus, the brake assigned to the second wheel (35) of the front axle (36) becomes ineffective.

However, since pressure medium serving as control pressure medium from the pressure medium supply container (47) of the first braking circuit (I) arrives at the second control input (19) of the first control valve (26) of the second control valve system (26, 30) via the second pressure medium output (41) of the motor car brake valve (43) and the pressure medium line (16), the valve of the first control valve (26) is held in its position in which it connects the pressure medium input chamber to the pressure medium output chamber. The first brake cylinder (34) of the front axle (36) is supplied with pressure medium from the pressure medium storage container (48) of the third braking circuit (III). Thus, the functioning of the brake assigned to the first wheel (37) of the front axle (36) is maintained.

In the same manner, the functioning of the vehicle brake assigned to the first wheel (37) of the front axle (36) is maintained if a defect occurs in the pressure medium line (38) or (16) going from the second pressure medium output (41) of the motor car brake valve (43) to the second control input (19) of the first control valve (26) of the second control valve system (26, 30). In such case, the first control valve (26) is actuated with pressure medium from the second braking circuit (II) serving as control pressure medium via the first pressure medium output (39) of the motor car brake valve (43) and via the pressure medium lines (15), (13) and (17).

Figure 2:
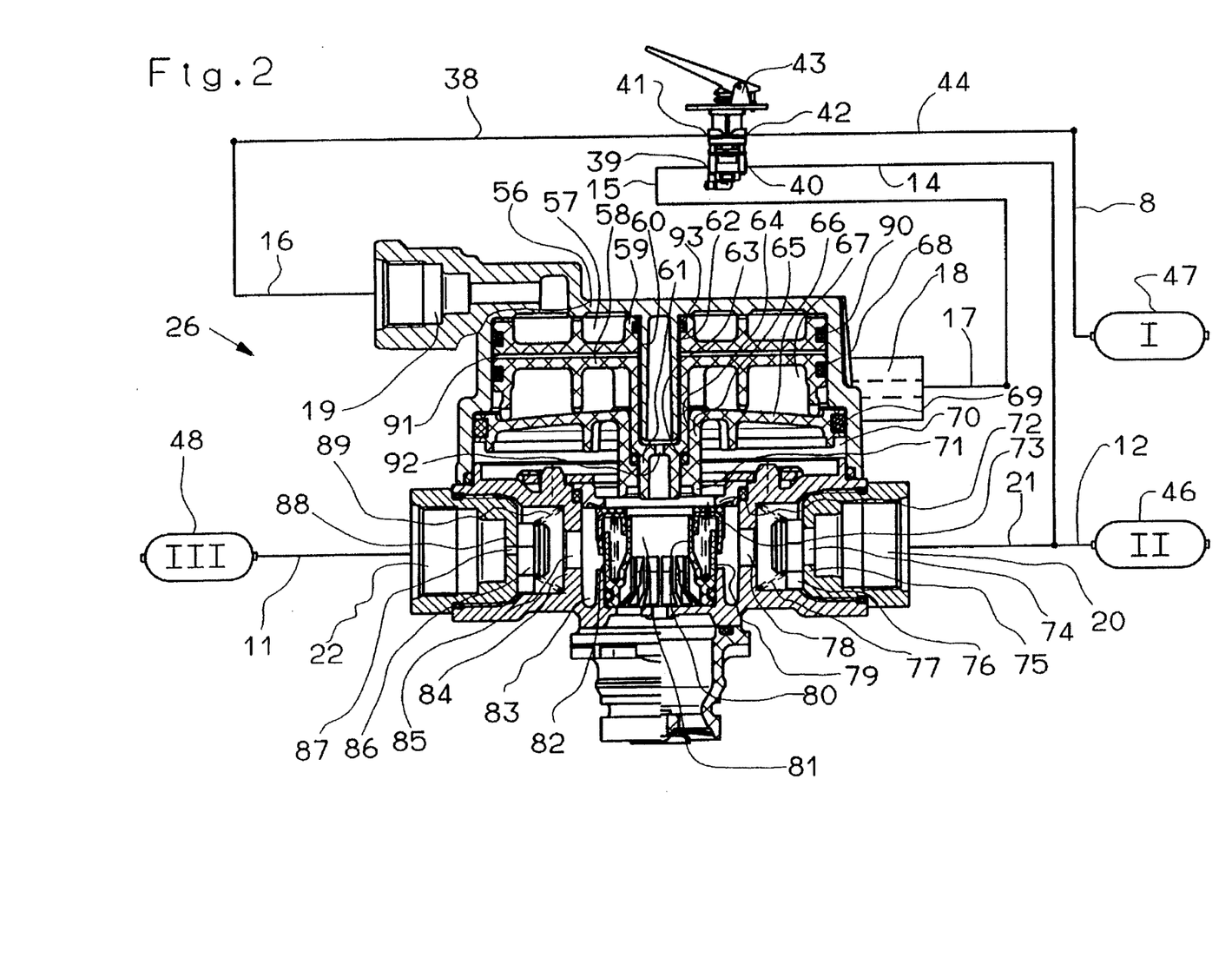
FIG. 2 shows the control valve assigned to one of the two brake cylinders which is supplied with pressure medium from two braking circuits of the vehicle.

Thus, in the pressure medium actuated vehicle braking system according to the invention, functioning of at least one brake assigned to a wheel of the front axle (36) is ensured in case of failure of the front axle braking circuit FIG. 2 shows a section through the first control valve (26) of the second control valve system (26, 30) shown in FIG. 1.

The first control valve (26) of the second control valve system (26, 30) is made in the form of a relay valve. For the sake of clarity the pressure medium inputs and pressure medium outputs of the motorcar brake valve (43), as well as the two pressure medium inputs and the two control inputs of the first control valve (26), are given the same reference numbers in FIG. 2 as in FIG. 1.

A housing (56) contains a first relay piston (66) serving as a control piston and a second relay piston (58) serving as a second control piston, said pistons being disposed one behind the other and coaxial relative to each other. The two relay pistons (66) and (58) serve as first and second control means of the first control valve (26). The two relay pistons (66) and (58) are capable of movement in the direction of the longitudinal axis of the housing (56). With its side away from the second relay piston (58), the first relay piston (66) delimits a pressure medium output chamber (70) and with its side towards the second relay piston (58), it delimits a first control chamber (67). The pressure medium output chamber (70) is connected to the pressure medium output (27) shown in FIG. 1 to which the pressure medium line (24) is connected. The pressure medium output (27) and the pressure medium line (24) are not shown in FIG. 2.

The second relay piston (58) delimits with its side towards the first relay piston (66) the first control chamber (67). With its side away from the first relay piston (66), second relay piston (58) delimits a second control chamber (57). The first relay piston (66) is provided with a sealing ring (69) on its circumference which presses sealingly against the wall of housing (56). The second relay piston (58) is provided with a first sealing ring (68) on its circumference and a second sealing ring (90) which press sealingly against the wall of housing (56). The sealing rings (69), (90) and (68) prevent an exchange of pressure medium between the first control chamber (67) and the second control chamber (57), as well as between the first control chamber (67) and the pressure medium output chamber (70) from taking place.

Within the second relay piston (58) and between its two sealing rings (68) and (90), a radial bore (91) is provided and is connected, via a gap (62) in the guide for the second relay piston (58) and a passage opening (92) located in a prolongation (65) of the second relay piston (58), to a pressure medium outlet of the relay valve. The two sealing rings (68) and (90) as well as the venting channels (91, 62, 92) ensure that no damage to one of the two sealing rings (68) and (90) goes unnoticed. Above the radial bore (91), in the area of the guide of the second relay piston (58), a sealing ring (93) is installed and seals off the second control chamber (57) and the gap (62) against each other.

The second relay piston (58) is provided with a centered extension (59, 61) extending on one side in the direction of the second control chamber (57) and on the other side in the direction of the first relay piston (66). In the portion (59) of the extension (59, 61) which extends towards the second control chamber (57), a pocket bore (62) is provided and centered. A journal-like projection (60) of the housing (56) extends into this pocket bore (62). The second relay piston (58) is thus supported slidingly on this journal-like projection (60) of the housing (56).

In the same manner, the first relay piston (66) is provided with a centered extension (65) extending in the direction of the pressure medium output chamber (70) which is provided with a centered stepped bore (64). The portion (61) of the extension (59, 61) of the extension (59, 61) of the second relay piston (58) which is towards the first relay piston (66) and which is also stepped, extends into the bore (64). The first relay piston (66) slides on the stepped portion (61) of the extension (59, 61) of the second relay piston (58). A sealing ring (63) is installed between the sides facing each other of the step of the stepped portion (61) of the extension (59, 61) of the second relay piston (58) and the step of the bore (64) located in the extension (65) of the first relay piston (66). This sealing ring (63) prevents any exchange of pressure fluid between the first control chamber (67) and the pressure medium output chamber (70) through the gap between the outer circumference of the extension (59, 61) and the wall of extension (65) delimiting the bore (64).

The first control chamber (67) is connected to a pressure medium connection serving as first control input (18). The second control chamber (57) is connected to a pressure medium connection serving as second control input (19).

The first relay piston (66) and the second relay piston (58) serve as control means to actuate a combined inlet and outlet valve (71, 72, 73) located in the housing (56). The pressure medium output chamber (70) can be connected to a pressure medium input chamber (83) or to a pressure medium outlet (81), or can be shut off against both by means of the combined inlet and outlet valve (71, 72, 73), depending on the position of the relay pistons (66) and (58). The combined inlet and outlet valve (71, 72, 73) comprises a ring-shaped inlet valve (72) which is coaxial with the extension (65) of the first relay piston (66) and is fixedly installed in the housing (56), a valve element (73) held on the seat of the inlet valve (72) by the force of a prestressed spring (82), and an outlet valve seat (71) formed by the free end portion of the extension (65) of the first relay piston (66).

Coaxial with the outlet valve seat (71) and to the seat of the inlet valve (72), a pipe-shaped body (unnumbered) is provided in the housing (56) across from the outlet valve seat (71) and the inlet valve seat (72). This pipe-shaped body extends in the direction of the inlet valve seat (72) and the outlet valve seat (71). On its side towards valve seat (72) and the outlet valve seat (71), the pipe-shaped body has a fork-shaped portion (79, 80) with two legs (79) and (80) extending substantially at a parallel to the longitudinal axis of the housing (56) towards the inlet valve seat (72).

The valve element (73) is made in the shape of a U-shaped body whose inner leg slides on the outer circumference of the inner leg (80) of the pipe-shaped body and whose outer leg slides on the outer circumference of the outer leg (79) of the pipe-shaped body. The valve element (73) is placed in such manner relative to the pipe-shaped body that the spring (82) which influences the valve element (73) bears with one end on the bottom of the fork-shaped portion (79, 80) of the pipe-shaped body, and with its other end lies on the bottom of the valve element (73) delimited by the two legs of the U-shaped valve element (73). The inner space delimited by the pipe-shaped body constitutes the pressure medium outlet (81) of the relay valve.

The pressure medium input chamber (83) is delimited by the outer circumference of the pipe-shaped body and a ring-shaped wall (84) of the housing (56) across from it. A first passage (78) and a second passage (85) are provided in the wall (84) of housing (56). The first passage (78) connects the pressure medium input chamber (83) to a first pressure medium connection serving as a first pressure medium input (20), and the second passage (85) connects the pressure medium input chamber (83) to a second pressure medium connection serving as a second pressure medium input (22). As described with reference to FIG. 1, the first pressure medium input (20) is connected via pressure medium line (21) and pressure medium line (12) to the pressure medium supply container (46) of the second braking circuit (II) of the vehicle. The second pressure medium input (22) is connected via pressure medium line (11) to the pressure medium storage container (48) of the third braking circuit (III) of the vehicle.

The first pressure medium input (20) is made in the form of a pot-shaped part with a bottom (75) having a passage (74). A valve element (76) is installed between the ring-shaped wall (84) of the housing (56) and the bottom (75) of the first pressure medium input (20). This valve element (76) is held on the bottom (75) of the first pressure medium input (20) by a pre-stressed spring (77). The valve element (76) covers the passage (74) in the bottom (75) of the first pressure medium input (20). A first check valve (75, 74, 76) is constituted by the bottom (75) of the first pressure medium input (20), the passage (74) provided in same and the valve element (76). This first check valve (75, 74, 76) can be brought into open position in the direction of pressure medium input chamber (83) by the pressure medium of the pressure medium supply container (46) of the second braking circuit (II).

The second pressure medium input (22) is also pot-shaped, with a bottom (88) provided with a passage (87). A valve element (86) is installed between the outer circumference of the ring-shaped wall (84) of housing (56) and the bottom (88) of the second pressure medium input (22). This valve element (86) lies on the bottom (88) of the second pressure medium input (22) and thereby covers the passage (87) in the bottom (88) of the second pressure medium input (22). The valve element (86) is pressed by a spring (89) in the direction of the bottom (88) of the second pressure medium input (22). The bottom (88) of the second pressure medium input (22) as well as the passage (87) provided in said bottom (88) and the valve element (86) constitute a second check valve (88, 87, 86) which can be brought into open position in the direction of the pressure medium input chamber (83) of the relay valve by the pressure medium of the pressure medium storage container (48) of the third braking circuit (III). The passage (87) of the second check valve (88, 87, 86) has a smaller cross-section than the passage (74) of the first check valve (75, 74, 76), so that pressure build-up in the pressure medium input chamber (83) occurs by first using the pressure medium from the second braking circuit (II).

The first control input (18) of the first control valve (26) is connected via pressure medium line (17) and pressure medium line (15) to the first pressure medium output (39) of the multi-circuit braking power imparting device in the form of motorcar brake valve (43). The first pressure medium input (40) of the motorcar brake valve (43) associated with the first pressure medium output (39) is connected via pressure medium line (14) and pressure medium line (12) to the pressure medium supply container (46) of the second braking circuit (II). The second control input (19) of the first control valve (26) is connected via pressure medium line (16) and pressure medium line (38) to the second pressure medium output (41) of the motorcar brake valve (43). The second pressure medium input (42) of the motorcar brake valve (43) associated with the second pressure medium output (41) is connected via the pressure medium lines (44) and (8) to pressure medium supply container (47) of the first braking circuit (I) of the pressure medium actuated vehicle braking system.

As was mentioned above, the first braking circuit (I) is the rear axle braking circuit, the second braking circuit (II) is the front axle braking circuit, and the third braking circuit (III) is a trailer braking circuit to supply the trailer braking system.

The operation of the described pressure relay valve (26) in the pressure-medium actuated vehicle braking system shall be described in greater detail below.

Pressure medium from the pressure medium supply container (46) of the second braking circuit (II) or pressure medium from the pressure medium storage container (48) of the second braking circuit (II) is available at the pressure medium input chamber (83) of the relay valve (26). When the motorcar brake valve (43) is not actuated, the first control input (18) and the second control input (19), and thereby also the first control chamber (67) and the second control chamber (57) of the first control valve (26), are without pressure. The first relay piston (66), the second relay piston (58) and the combined inlet and outlet valve (71, 72, 73) are in the position shown.

If the motorcar brake valve (43) is actuated to carry out a braking action, pressure medium serving as control pressure goes from the second pressure medium output (41) of the motorcar brake valve (43) via pressure medium lines (38) and (16) from the first pressure medium supply container (47) of the first braking circuit (I) into the second control chamber (57) of the first control valve (26). At the same time pressure medium serving as control pressure goes from the pressure medium supply container (46) of the second braking circuit (II) via the first pressure medium output (39) of the motorcar brake valve (43) through the pressure medium lines (15) and (17) into the first control chamber (67) of the first control valve (26).

The first relay piston (66) is shifted by the pressure building up in the first control chamber (67) in the direction of the pressure medium output chamber (70). The second relay piston (58) remains in its starting position since the pressure building up in the first control chamber (67) and the pressure in the second control chamber (57) of the second relay piston (58) are balanced. The outlet valve seat (71) of the first relay piston (66) comes down on the valve element (73), whereby the outlet valve (73, 71) of the combined inlet and outlet valve (71, 72, 73) reaches its closed position. During the continued downward movement of the first relay piston (66), the valve element (73) is lifted off the inlet valve seat (72). The inlet valve (72, 73) is then in its open position.

Pressure medium then flows from the pressure medium input chamber (83) through the open inlet valve (72, 73) into the pressure medium output chamber (70) and from the latter continues into the first brake cylinder (34) of the vehicle front axle (36).

If a defect occurs in the second braking circuit (II), e.g., the rupture of pressure medium line (21), the pressure at the first pressure medium input (20) of the first control valve (26) drops. Due to the pressure drop at the first pressure medium input (20), the first check valve (75, 74, 76) goes into its closed position. The pressure medium input chamber (83) of the first control valve (26) is then sealed off from the first pressure medium input (20). Pressure medium then streams out of the third pressure medium storage container (48) through the second check valve (88, 87, 86), which is then going into its open position or has already reached its open position, into the pressure medium input chamber (83), and from there through the inlet valve (72, 73) into the pressure medium output chamber (70), from which it reaches the first brake cylinder (34). Pressure medium is brought into the first brake cylinder (34) until the first control valve (26) has reached its terminal position.

Simultaneously with the pressure drop at the first pressure medium input (20), the pressure also falls in the first control chamber (67) of the relay valve, because when the motorcar brake valve (43) is actuated, the pressure of the first control chamber (67) is bled off via the pressure medium lines (17) and (15), the open valve of the motorcar brake valve (43), the pressure medium line (14), and the defective pressure medium line (21) into the atmosphere. Due to the pressure drop in the first control chamber (67), the pressure exerted upon the second relay piston (58) in the second control chamber (57) prevails. The second relay piston (58) moves in the direction of the first relay piston (66), comes into contact against it and holds the first relay piston (66) in its previously assumed position. For the control of the first control valve (26) the pressure of the first braking circuit (I) is thus used in case of failure of the second braking circuit (II), and the pressure from the pressure medium storage container (48) of the third braking circuit (III) is used in such case to supply the first brake cylinder (34) of the vehicle front axle (36).

When the motorcar brake valve (43) is released in order to end the braking process, the second control chamber (57) of the first control valve (26) is vented into the atmosphere via the motorcar brake valve (43). Due to the difference between the pressure in the second control chamber (57) and the pressure in the pressure medium output chamber (70) which occurs in that case, the second relay piston (58) is shifted away from the first relay piston (66) in the direction of the second control chamber (57). The outlet valve seat (71) lifts off from the valve element (73). The combined inlet and outlet valve (71, 72, 73) is then open and the pressure of the pressure medium output chamber (70) is vented via the combined inlet and outlet valve (71, 72, 73) and the pressure medium outlet (81) into the atmosphere. At the same time, the first brake cylinder (34) of the vehicle front axle (36) is vented also via the pressure medium output chamber (70) and the combined inlet and outlet valve (71, 72, 73) and the pressure medium outlet (81) of the relay valve into the atmosphere.

If a defect occurs in the third braking circuit (III), this does not have any effect upon the control function of the relay valve (26) because the pressure of the third braking circuit (III) is not used to control the relay valve (26). In such case the pressure of the second braking circuit (II) alone serves to supply the first brake cylinder (34) of the vehicle front axle. The pressure medium input chamber (83) of the relay valve is then shut off by the second check valve (88, 87, 86) against the second pressure medium input (22).

If a defect occurs in the first braking circuit (I), this results in the failure of the operation of the brakes of the rear axle (3). However, this has no effect on the operation of the brakes of the vehicle front axle (36). The first control chamber (67) of the first control valve (26) is supplied with braking medium from the pressure medium supply container (46) of the second braking circuit (II) via the pressure medium lines (12) and (14), the motorcar brake valve (43), and the pressure medium lines (15) and (17) during a braking action. The combined inlet and outlet valve (71, 72, 73) is actuated by means of the first relay piston (66), and the second relay piston (58) is held in its starting position by the pressure medium in the first control chamber (67).

The first brake cylinder (34) of the vehicle front axle (36) is supplied with pressure medium from the second braking circuit (II) via the then open inlet valve (72, 73) of the combined inlet and outlet valve (71, 72, 73).

Due to the fact that the pressure medium input chamber (83) of the relay valve (26) is supplied pressure from two separate braking circuits, and due to the fact that two controllable relay pistons (66, 58) independent of each other and controlled from the pressure medium sources of two independent braking circuits are provided to actuate the combined inlet and outlet valve (71, 72, 73) of the first control valve (26), the supply of braking medium to the brake cylinder assigned to this relay valve is ensured.

The two relay pistons (66, 58) need not be made and placed relative to each other as shown in the drawings. It is significant for the invention that each of these two relay pistons (66) and (58) can be subjected to pressure from a separate pressure medium source and that the combined inlet and outlet valve (71, 72, 73) can be actuated by the relay pistons (66) and (58).

The configuration and placement of the two check valves (75, 74, 76) and (88, 87, 87) is not limited to the embodiments described herein. It is significant that if the pressure at one of the two pressure medium inputs (20) or (22) drops, the pressure medium input chamber (83) of the first control valve (26) is shut off from the affected pressure medium input (20) or (22).

It is mentioned in the description that the brake cylinders can be connected via their assigned control valves to a pressure medium source or to a pressure medium sink. This statement should also be understood to mean that additional check valves, such as, e.g., ABS check valves can be inserted in the pressure medium lines going from the control valves to the brake cylinders, among them also an outlet valve through which the associated brake cylinder can be connected to a pressure medium sink. For pneumatically operated systems, the atmosphere is considered to be the pressure medium sink. With a hydraulic system, the pressure medium sink is a sump, for example. The pressure medium actuated vehicle braking system described herein may be a pneumatically actuated vehicle braking system or a combined hydraulic/pneumatic vehicle braking system.

The vehicle braking system according to the invention may be controlled pneumatically, hydraulically or also electrically.

If the vehicle braking system according to the invention is at least in part controlled electrically, the multi-circuit braking power imparting device should be equipped with at least one electrical device, such as a potentiometer, and with at least one electrical control output, whereby the electrical control output of the multi-circuit braking power imparting device should then be connected to an electrical control input of an electrically controlled control valve assigned to at least one brake cylinder.

The electrical control signal to control the brake pressure may be an electrical signal dependent upon the position of the actuating element (pedals) of the multi-circuit braking power imparting device.

The control valve may employ a proportional solenoid valve assigned to the control chamber as the electric control means. It is of course also possible to make the control valve or valves in the form of pressure modulator(s) actuated by electrical control signals of the multi-circuit braking power imparting device.

In the embodiment of the claimed invention described herein, the multi-circuit braking power imparting device is a motorcar brake valve of a traction vehicle, wherein this motorcar brake valve produces a pneumatic control signal associated with a first braking circuit (rear axle braking circuit) and a pneumatic control signal associated with a second braking circuit (front axle braking circuit). The first control valve system as well as the second control valve system in the embodiment described herein are pneumatically controlled control valves, wherein the second control valve system has two control valves.

Whether the vehicle braking system is controlled pneumatically, hydraulically or electrically, each brake cylinder of one vehicle axle must be assigned a separate control valve, it being possible to actuate at least one of the control valves by two circuits, whereby the pressure medium input chamber of this control valve must be connected to two different control medium sources. Means should be provided to ensure that the different pressure medium sources assigned to the individual braking circuits are secured against each other, so that in case of a defect in one braking circuit, the pressure medium source of another braking circuit does not empty itself. It is of course not necessary to assign each pressure medium storage container its own compressor.

The application of the invention is of course not limited to the brakes on the front axle of a vehicle. The invention can be applied equally to brakes of the rear axle or to the brakes of additional axles of the vehicle.

While the invention has been described by reference to a specific embodiment, this was done for purposes of illustration only. Numerous alternatives will be apparent to those skilled in the art and are considered to be within the scope of the invention.

We claim:

1. Pressure-medium actuated vehicle braking system, comprising:

a multi-circuit braking power imparting device, at least first and second braking circuits, said first braking circuit comprising a first pressure medium storage container, at least a first braking cylinder, and a first control valve system which connects said first braking cylinder of said first braking circuit to said first pressure medium storage container or to a pressure medium sink in dependence on a first control signal for said first braking circuit produced by said braking power imparting device, said second braking circuit comprising a second pressure medium storage container, first and second braking cylinders, and a second control valve system, said second control valve system comprising first and second control valves assigned to said first and second braking cylinders of said second braking circuit, respectively, said first control valve being connected to said braking power imparting device so as to receive said first control signal for said first braking circuit and a second control signal produced by said braking power imparting device for said second braking circuit, said first control valve connecting said first braking cylinder of said second braking circuit to one of two pressure medium sources which are independent of each other, or to a pressure medium sink in dependence on said first and second control signals received by said first control valve, said second control valve connecting said second braking cylinder of said second braking circuit to said second pressure medium storage container or to a pressure medium sink in dependence on said second control signal.

2. The braking system of claim 1, wherein one of said two independent pressure medium sources comprises said second pressure medium storage container assigned to said second braking circuit.

3. The braking system of claim 2, wherein the other of said two independent pressure medium sources comprises a third pressure medium storage container assigned to a third braking circuit.

4. The braking system of claim 1, wherein said first control signal is a pneumatic control signal.

5. The vehicle braking system of claim 1, wherein said first control signal is an electrical control signal.

6. The braking system of claim 1, wherein said second control signal is a pneumatic control signal.

7. The braking system of claim 1, wherein said second control signal is an electrical control signal.

8. The braking system of claim 1, wherein said braking power imparting device is a motorcar brake valve having a first pressure medium input, a second pressure medium input, and first and second pressure medium outputs associated with said first and second pressure medium inputs, respectively, said first pressure medium input is connected to said second pressure medium storage container and said second pressure medium input is connected to said first pressure medium storage container, said first control valve is a pneumatically controlled control valve with a first control input and a second control input, said first control input of said first control valve is connected to said first pressure medium output of said motorcar brake valve to receive said second control signal, and said second control input of said first control valve is connected to said second pressure medium output of said motorcar brake valve to receive said first control signal.

9. The vehicle braking system of claim 8, wherein said first control valve comprises a pressure medium input chamber, a pressure medium output chamber, a first control chamber connected to said first control input, and a second control chamber connected to said second control input.

10. The braking system of claim 9, wherein said first control chamber is delimited by a first control piston and the second control chamber is delimited by a second control piston.

11. The braking system of claim 10, wherein said first control valve further comprises a combined inlet and outlet valve through which said pressure medium output chamber can be connected to said pressure medium input chamber or to a pressure medium outlet leading to pressure medium sink, or which can isolate said pressure medium output chamber, depending on the position of at least one of said first and second control pistons.

12. The braking system of claim 11, wherein said pressure medium output chamber is connected via a pressure medium output of said first control valve to said first braking cylinder of said second braking circuit, and said pressure medium input chamber is connected via a first pressure medium input to said second pressure medium storage container and via a second pressure medium input to a third pressure medium storage container which is independent of said second pressure medium storage container.

13. The braking system of claim 12, wherein said first control chamber is connected via said first control input to said first pressure medium output of said motorcar brake valve, and said second control chamber is connected via said second control input to said second pressure medium output of said motorcar brake valve.

14. The braking system of claim 13, wherein said first and second control pistons and said combined inlet and outlet valve are configured so that if said first braking circuit or said second braking circuit fails, said control piston assigned to the non-failing braking circuit will actuate said combined inlet and outlet valve.

15. The braking system of claim 14, wherein a first check valve is installed in said first pressure medium input of said first control valve, and a second check valve is installed in said second pressure medium input of said first control valve to keep said first and third pressure medium storage containers independent of each other.

16. The braking system of claim 15, wherein said first and second control pistons comprise first and second relay pistons and are disposed coaxially relative to each other.

17. The braking system of claim 16, wherein said first relay piston delimits said pressure medium output chamber with a side facing away from said second relay piston, and delimits said first control chamber with a side facing towards said second relay piston.

18. The braking system of claim 17, wherein said second relay piston delimits said first control chamber with a side facing towards said first relay piston, and delimits said second control chamber with a side facing away from said first relay piston.

19. The braking system of claim 18, wherein said first and second relay pistons are configured relative to each other and to said combined inlet and outlet valve so that said first relay piston is slaved by said second relay piston in a direction towards said combined inlet and outlet valve in case of a pressure failure in said first control chamber, and said second relay piston is pushed back by said first relay piston or by pressure in said first control chamber in a direction towards said second control chamber in case of a pressure drop in said second control chamber.

20. The braking system of claim 1, wherein said braking power imparting device comprises two control outputs wherein at least one of said control outputs is an electrical control output which is connected to an electrical device of said braking power imparting device to produce an electrical control signal, and wherein said first control valve system and said second control valve system each contains at least one electrical control input which is connected on one side to said electrical control output of said braking power imparting device and on another side to electrical control means of said first and second control valve systems.

21. The braking system of claim 20, wherein said electrical control means of said first and second control valve systems comprise a proportional solenoid.

22. The braking system of claim 21, wherein at least one of said first and second control valve systems comprises an electrically controlled pressure modulator.

23. The braking system of claim 22, wherein said motorcar brake valve comprises a potentiometer emitting an electrical signal which depends on the position of an actuating element of said braking power imparting device.

* * * * *